(12) United States Patent
Yamashita et al.

(10) Patent No.: US 11,809,340 B2
(45) Date of Patent: Nov. 7, 2023

(54) MEMORY CARD FOR DATA TRANSFER SYSTEM, DATA STORAGE DEVICE, SYSTEM HOST, AND MEMORY CARD IDENTIFICATION METHOD

(71) Applicant: Panasonic Intellectual Property Management Co., Ltd., Osaka (JP)

(72) Inventors: Hideaki Yamashita, Kyoto (JP); Takeshi Ootsuka, Hyogo (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 307 days.

(21) Appl. No.: 17/378,068

(22) Filed: Jul. 16, 2021

(65) Prior Publication Data

US 2021/0342278 A1 Nov. 4, 2021

Related U.S. Application Data

(63) Continuation of application No. PCT/JP2019/038565, filed on Sep. 30, 2019.

(30) Foreign Application Priority Data

Feb. 25, 2019 (JP) ................................ 2019-031502

(51) Int. Cl.
*G06F 13/16* (2006.01)
*G06F 3/06* (2006.01)

(52) U.S. Cl.
CPC ........ *G06F 13/1668* (2013.01); *G06F 3/0604* (2013.01); *G06F 3/0659* (2013.01); *G06F 3/0679* (2013.01)

(58) Field of Classification Search
CPC .. G06F 13/1668; G06F 3/0604; G06F 3/0659; G06F 3/0679

(Continued)

(56) References Cited

U.S. PATENT DOCUMENTS 4,979,144 A * 12/1990 Mizuta ................ G06F 12/0684
711/E12.089
7,692,929 B2 * 4/2010 Coutancier ......... G06F 13/4243
361/761

(Continued)

FOREIGN PATENT DOCUMENTS

JP 2009-70255 4/2009
JP 2009-87124 4/2009

(Continued)

OTHER PUBLICATIONS

International Search Report dated Dec. 10, 2019 in corresponding International Application No. PCT/JP2019/038565.

*Primary Examiner* — Paul R. Myers
(74) *Attorney, Agent, or Firm* — Wenderoth, Lind & Ponack, L.L.P.

(57) ABSTRACT

A memory card includes first and second interface units connected to a system host, a memory unit, and an additional information registration unit. The memory unit includes a first identifier storage unit that stores an identifier of the memory unit, a flash memory, and a memory controller that controls the first identifier storage unit and the flash memory via the first interface unit. The additional information registration unit includes a second identifier storage unit that stores an identifier same as the identifier of the memory unit, and an additional information notification unit that notifies the system host of the identifier in the second identifier storage unit and additional information via the second interface unit. When the memory card is connected to the system host, the memory unit and the additional information registration unit are associated with each other by the identifiers stored in the first and second identifier storage units.

19 Claims, 12 Drawing Sheets

(58) Field of Classification Search
USPC .......................................................... 710/301
See application file for complete search history.

(56) References Cited

U.S. PATENT DOCUMENTS

| | | | |
|---|---|---|---|
| 2004/0059846 A1* | 3/2004 | Liu | G06K 19/07732 |
| | | | 710/62 |
| 2004/0078700 A1* | 4/2004 | Jeong | G11C 29/765 |
| | | | 714/42 |
| 2005/0152544 A1* | 7/2005 | Kizawa | H04N 1/00413 |
| | | | 380/55 |
| 2006/0172606 A1* | 8/2006 | Irisawa | G06F 3/0605 |
| | | | 439/630 |
| 2009/0006681 A1* | 1/2009 | Hubert | G06F 13/409 |
| | | | 710/72 |
| 2009/0006707 A1* | 1/2009 | Hubert | G06F 13/1684 |
| | | | 710/313 |
| 2009/0077295 A1 | 3/2009 | Konno et al. | |
| 2009/0089460 A1 | 4/2009 | Komoda | |
| 2009/0292896 A1 | 11/2009 | Ando et al. | |
| 2013/0117508 A1* | 5/2013 | Yamamoto | G06F 21/44 |
| | | | 711/E12.001 |
| 2013/0155447 A1 | 6/2013 | Fujiki | |
| 2014/0169540 A1* | 6/2014 | Suga | H04M 7/0024 |
| | | | 379/93.09 |
| 2015/0248368 A1 | 9/2015 | Otsuka | |
| 2017/0199673 A1* | 7/2017 | Park | G06F 3/0688 |

FOREIGN PATENT DOCUMENTS

| | | |
|---|---|---|
| JP | 2009-282851 | 12/2009 |
| JP | 2013-127745 | 6/2013 |
| JP | 2015-29352 | 2/2015 |
| JP | 2015-180980 | 10/2015 |

* cited by examiner

MEMORY CARD FOR DATA TRANSFER SYSTEM, DATA STORAGE DEVICE, SYSTEM HOST, AND MEMORY CARD IDENTIFICATION METHOD

BACKGROUND

1. Technical Field

The present disclosure relates to a memory card, a data storage device, a system host, and a memory card identification method for a data transfer system that connects a system host and a memory card with an adapter to perform data transfer.

2. Description of the Related Art

With the high transfer speed of a flash memory, the data transfer system of a memory card is shifting from a parallel data transfer system to a differential serial transfer system, and as the transfer system, PCI Express (registered trademark) (hereinafter, referred to as "PCIe") as a high-speed serial interface is used in various electronic devices such as a personal computer.

For example, PCIe is also used in a system configuration in which the system host is a video server and the local device is a memory card.

A system has been normally used in which a local bus on a system host side as an external interface is logically mapped in physically different signals, and the external interface is converted into a protocol of the local bus on the system host side by an external device such as an adapter. Further, in this system, a daisy chain connection is often made between an external device and a physically different external interface, and in this case, a chip (an integration unit) that integrates two communication paths is required, and thus, the transfer performance for switching is degraded and the cost due to a complicated configuration increases.
Patent Literatures (PTLs) is as Follows:
PTL 1: Unexamined Japanese Patent Publication No. 2015-029352
PTL 2: Unexamined Japanese Patent Publication No. 2009-282851
PTL 3: Unexamined Japanese Patent Publication No. 2009-087124
PTL 4: Unexamined Japanese Patent Publication No. 2015-180980
PTL 5: Unexamined Japanese Patent Publication No. 2009-070255
PTL 6: Unexamined Japanese Patent Publication No. 2013-127745

SUMMARY

The present disclosure provides a memory card, a data storage device, a system host, and a memory card identification method in order to perform data transfer that reduces the number of control components to minimize a decrease in speed and achieves a cost reduction.

The memory card according to the present disclosure includes two external interfaces including a first interface unit and a second interface unit that are connected to a system host, a memory unit, and an additional information registration unit. The first interface unit controls an external device using an interface of a physical signal common to a local bus of the system host. The second interface unit is an interface different from the local bus. The memory unit includes a first identifier storage unit that stores an identifier of the memory unit, a flash memory that stores user data, and a memory controller that controls the first identifier storage unit and the flash memory via the first interface unit. The additional information registration unit includes a second identifier storage unit that stores an identifier same as the identifier of the memory unit, and an additional information notification unit that stores additional information and notifies the system host of the identifier in the second identifier storage unit and the additional information via the second interface unit. When the memory card is connected to the system host, the memory unit and the additional information registration unit are associated with each other by the identifier stored in the first identifier storage unit and the identifier stored in the second identifier storage unit.

The data storage device according to the present disclosure is connected to a system host by a cable that communicates a first data signal for high-speed data communication and a second data signal for standard data communication with a lower communication speed than a communication speed of the high-speed data communication, and the data storage device includes an adapter and a memory card. The adapter includes an interface converter having a first adapter interface unit that communicates the first data signal of the system host to the memory card and a second adapter interface unit that communicates the second data signal of the system host to the memory card. The memory card communicates the first data signal and the second data signal of the adapter and includes a memory unit and an additional information registration unit. The first adapter interface unit supports a plurality of types of communication protocols and performs communication using one communication protocol selected from the plurality of types of communication protocols, and the one communication protocol controls an external device using an interface of a physical signal common to a local bus of the system host. The second adapter interface unit specifies a type of the one communication protocol in the first adapter interface unit immediately after connection to make the first adapter interface unit communicable with the one communication protocol, and after making the first adapter interface unit communicable, performs communication using a communication protocol different from the communication protocol in the first adapter interface unit. The memory unit includes a first identifier storage unit that stores an identifier of the memory unit, a flash memory that stores user data, and a memory controller that controls the first identifier storage unit and the flash memory via a first memory interface unit. The additional information registration unit includes a second identifier storage unit that stores an identifier same as the identifier of the memory unit, and an additional information notification unit that stores additional information and notifies the system host of the identifier in the second identifier storage unit and the additional information via a second memory interface unit. When the memory card is connected to the system host, in the system host, the memory unit and the additional information registration unit are associated with each other by the identifier stored in the first identifier storage unit and the identifier stored in the second identifier storage unit.

The system host according to a first aspect of the present disclosure includes a first interface that is connected to a first interface unit of a memory card, a second interface that is connected to a second interface unit of the memory card, and an identifier association unit. The first interface is an interface for a physical signal common to a local bus, and acquires an identifier and reads and writes user data via the first interface unit of the memory card. The second interface controls the memory card using an interface that is different from the interface for a physical signal common to the local bus, and acquires, via the second interface unit of the memory card, an identifier same as the identifier acquired via the first interface unit of the memory card. The identifier association unit associates the first interface unit of the memory card with the second interface unit of the memory card when the memory card is connected to the system host.

The system host according to a second aspect of the present disclosure includes a first interface that is connected to a first interface unit of a memory card via a first interface unit of an adapter, a second interface that is connected to a second interface unit of the memory card via a second interface unit of the adapter, and an identifier association unit. The first interface is an interface for a physical signal common to a local bus, and acquires an identifier and reads and writes user data via the first interface unit of the memory card. The second interface controls the memory card using an interface that is different from the interface for a physical signal common to the local bus, and acquires, via the second interface unit of the memory card, an identifier same as the identifier acquired via the first interface unit of the memory card. The identifier association unit associates the first interface unit of the memory card with the second interface unit of the memory card when the memory card is connected to the system host.

The memory card identification method according to the present disclosure includes storing an identifier of a memory unit in the memory unit of a memory card, storing an identifier of an additional information registration unit in the additional information registration unit of a memory card, reading and acquiring the identifier of the memory unit, reading and acquiring the identifier of the additional information registration unit, and comparing the identifier of the memory unit acquired with the identifier of the additional information registration unit acquired and determining whether the memory unit and the additional information registration unit are in a same memory card.

In the memory card, the data storage device, and the system host for data transfer according to the present disclosure, the memory card is connected equivalently to the local bus on a system host side, so that the number of control components is reduced, a decrease in speed is minimized, and a cost reduction is achieved.

DETAILED DESCRIPTION

Exemplary embodiments will be described below in detail with reference to the drawings as appropriate. However, a detailed description more than necessary may be omitted. For example, a detailed description of a well-known matter and a duplicated description of substantially the same configuration will be omitted in some cases. This is to prevent the following description from becoming unnecessarily redundant, thereby facilitating the understanding of those skilled in the art.

Here, the inventors of the present disclosure provide the accompanying drawings and the following description such that those skilled in the art can fully understand the present disclosure, and therefore, they do not intend to restrict the subject matters of claims by the accompanying drawings and the following description.

1. Background to Exemplary Embodiments

As disclosed in PTL 1, a conventional memory card has a plurality of communication paths, and identifies a physical communication scheme of the memory card in one communication path. Furthermore, after the connection of the other communication path is completed, the communication path for identifying the memory card can also be used for simple data communication in parallel with the data transfer in the other communication path. A conventional technique will be described with reference to block diagrams of FIGS. 8 and 10.

Figure 8:
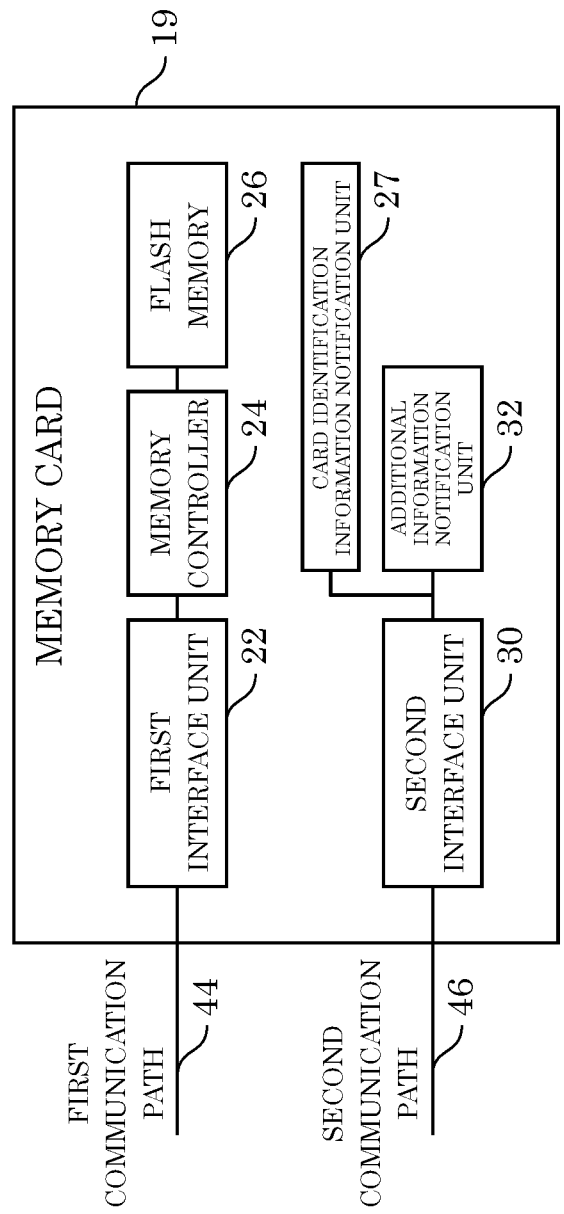
FIG. 8 is a block diagram of a memory card that has two communication paths (first communication path, second communication path).

Memory card 19 illustrated in FIG. 8 has two communication paths (first communication path 44, second communication path 46). First communication path 44 is a communication path for performing main high-speed transfer (high-speed data communication), whereas second communication path 46 is a communication path for identifying a physical communication scheme of first communication path 44. Memory card 19 includes flash memory 26, memory controller 24, and first interface unit 22. Flash memory 26 is a nonvolatile memory that continues to hold written data even when the power is turned off. Memory controller 24 controls initialization of flash memory 26 and data read and write. First interface unit 22 is an interface unit that supports a physical signal and a logical protocol of first communication path 44. First interface unit 22 desirably performs high-speed data communication.

Memory card 19 further includes card identification information notification unit 27, second interface unit 30, and additional information notification unit 32. Card identification information notification unit 27 is a notification unit that notifies a physical communication scheme of first communication path 44. Second interface unit 30 is an interface unit that converts a physical signal of second communication path 46, and additional information notification unit 32 is changed to card identification information notification unit 27 by second interface unit 30 after the connection of first communication path 44 is completed, and notifies the additional information of memory card 19 through second communication path 46. The additional information is, for example, information indicating restriction of access of user data to memory card 19. Second interface unit 30 may perform standard data communication.

Figure 9:
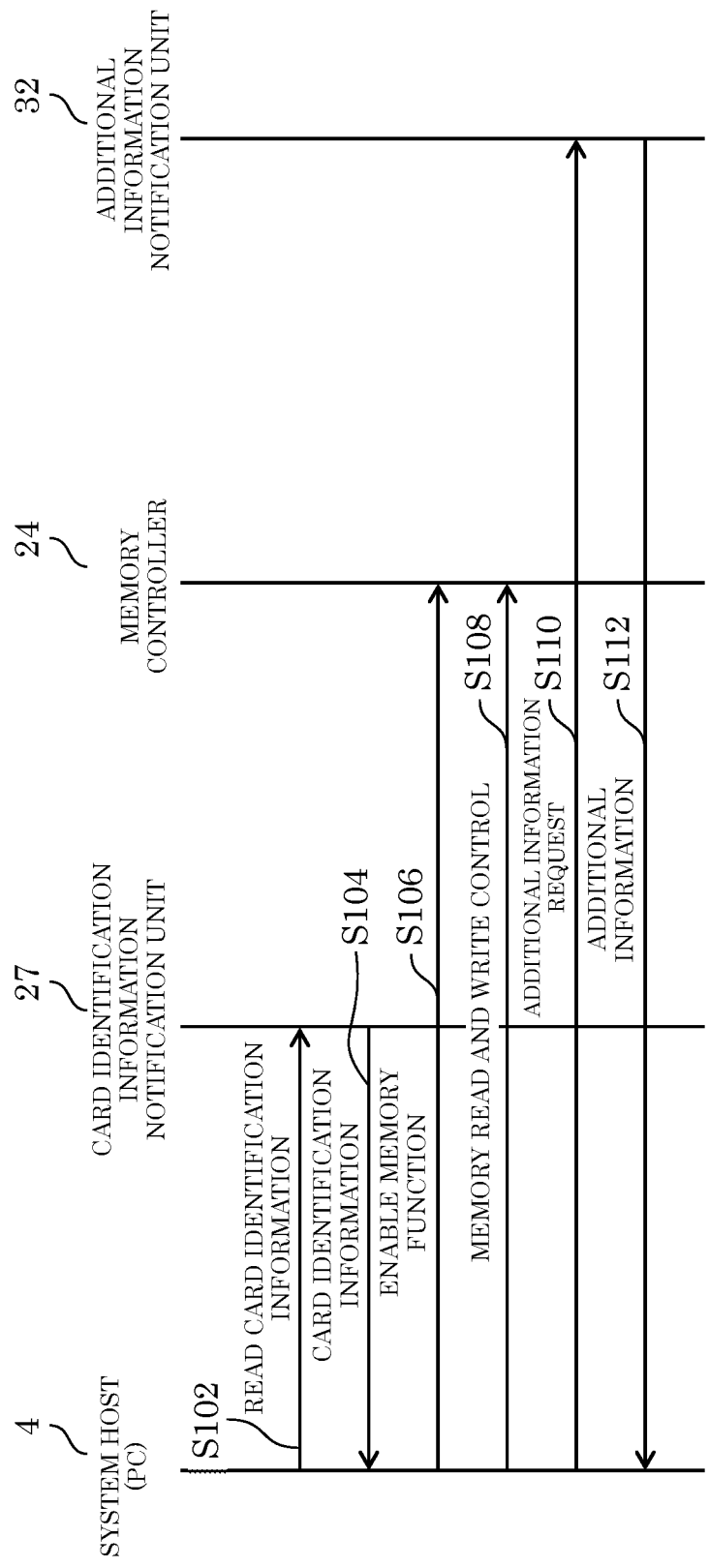
FIG. 9 is a sequence diagram for explaining an operation of each block of the memory card illustrated in FIG. 8 and the system host.

FIG. 9 is a sequence diagram for explaining an operation of each block of memory card 19 illustrated in FIG. 8 and system host 4 (not illustrated). A processing sequence among system host 4, card identification information notification unit 27, memory controller 24, and additional information notification unit 32 in the respective blocks of memory card 19 and system host 4 will be described. First, system host 4 reads card identification information from card identification information notification unit 27 (S102), and acquires the card identification information from card identification information notification unit 27 (S104). System host 4 enables a memory function of memory controller 24, initializes memory controller 24, and makes memory controller 24 communicable through first communication path 44 (S106). System host 4 executes memory read and write control on memory controller 24 to record data in flash memory 26 and read data from flash memory 26 (S108). Further, system host 4 requests additional information from additional information notification unit 32 (S110), and acquires the additional information from additional information notification unit 32 (S112).

Figure 10:
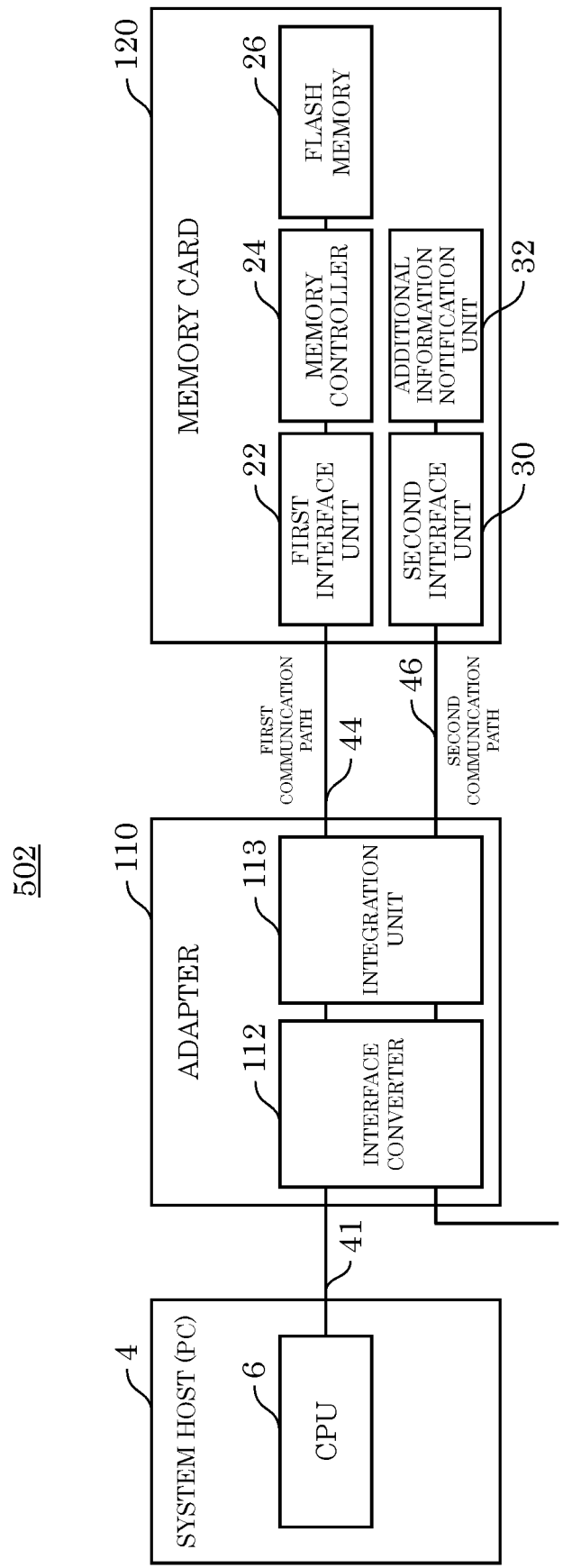
FIG. 10 is a block diagram for explaining a data transfer system of another conventional technique that transmits and receives data in a memory card to and from a system host represented by a personal computer.

FIG. 10 is a block diagram for explaining data transfer system 502 of another conventional technique that transmits and receives data in memory card 120 to and from system host 4 represented by a personal computer. Data transfer system 502 illustrated in FIG. 10 includes system host 4, adapter 110, and memory card 120. Adapter 110 performs data conversion for an interface with each of system host 4 and memory card 120, and provides a data read and write function. Interface converter 112 in adapter 110 is an interface converter that performs conversion into a protocol of memory card 120 so as to support the interface with system host 4. Further, integration unit 113 in adapter 110 is an integration unit that integrates two communication paths, that is, first communication path 44 and second communication path 46 of memory card 120 for control. As described above, data transfer system 502 illustrated in FIG. 10 supports data read and write by bundling two communication paths into one in adapter 110 for the integration into one protocol for system host 4.

Figure 11:
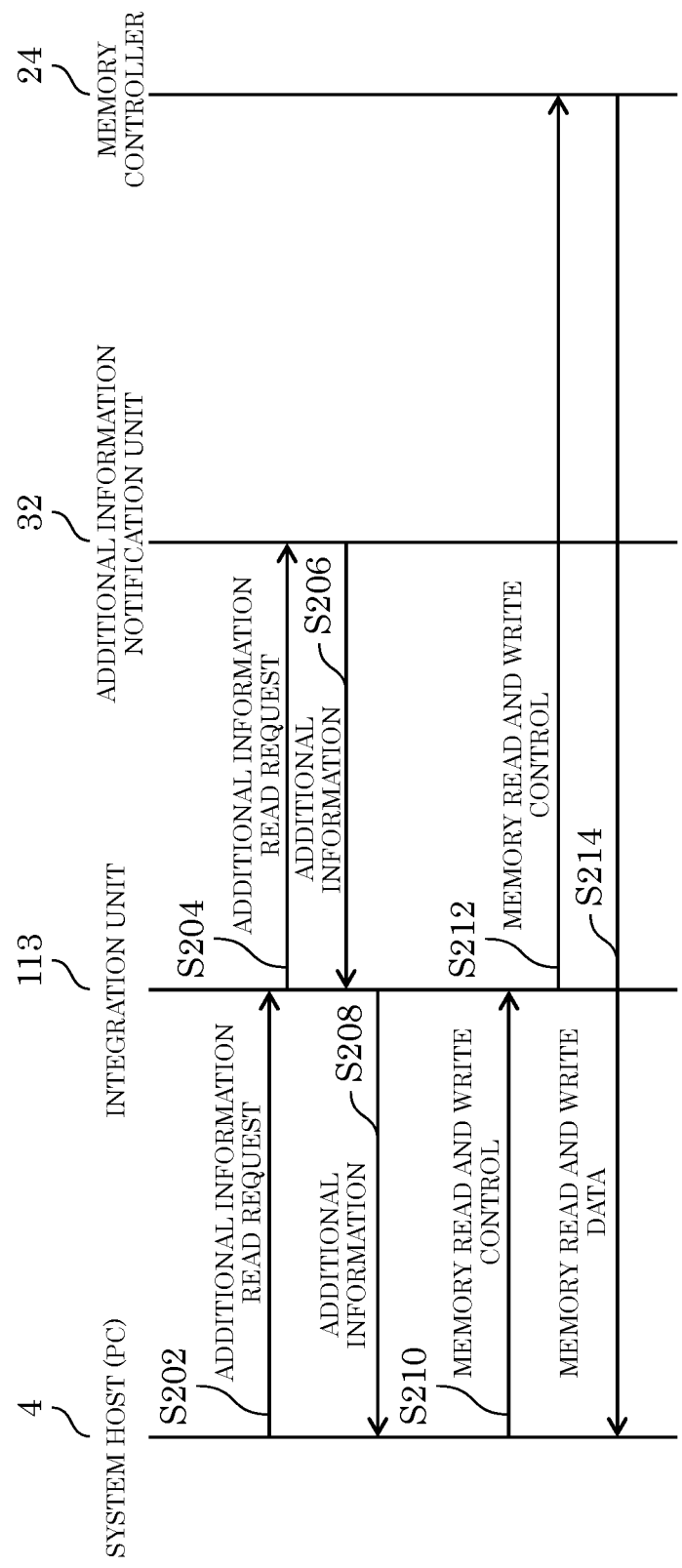
FIG. 11 is a sequence diagram for explaining an operation of each block of the data transfer system illustrated in FIG. 10.

FIG. 11 is a sequence diagram for explaining an operation of each block of data transfer system 502 illustrated in FIG. 10. A processing sequence among system host 4, integration unit 113 (in adapter 110), additional information notification unit 32 (in memory card 120), and memory controller 24 in the respective blocks of data transfer system 502 will be described. First, system host 4 makes an additional information read request to integration unit 113 (S202), and in response to this, integration unit 113 makes an additional information read request to additional information notification unit 32 (S204). Additional information notification unit 32 notifies system host 4 of the additional information via integration unit 113 (S206) (S208). System host 4 executes memory read and write control on memory controller 24 (S212) via integration unit 113 (S210) to record data in flash memory 26 and read data from flash memory 26 (S214).

Meanwhile, in data transfer system 502 illustrated in FIG. 10, it is necessary to bridge a communication protocol between system host 4 and memory card 120 in order to pass through integration unit 113 that bundles two communication paths, and thus a problem of a decrease in transfer speed occurs. Furthermore, in order to achieve high-speed communication, it is necessary to mount a high-speed and expensive circuit, and in particular, a problem in manufacturing cost may also occur.

The exemplary embodiments solve the problems described above, and provide a data transfer system that connects a memory card equivalently to a local bus on a system host side, thereby reducing the number of control components, minimizing a decrease in speed, and achieving a cost reduction.

2. First Exemplary Embodiment

A first exemplary embodiment will be described below with reference to FIGS. 1 to 4.

2.1. Configuration of Data Transfer System

Figure 1:
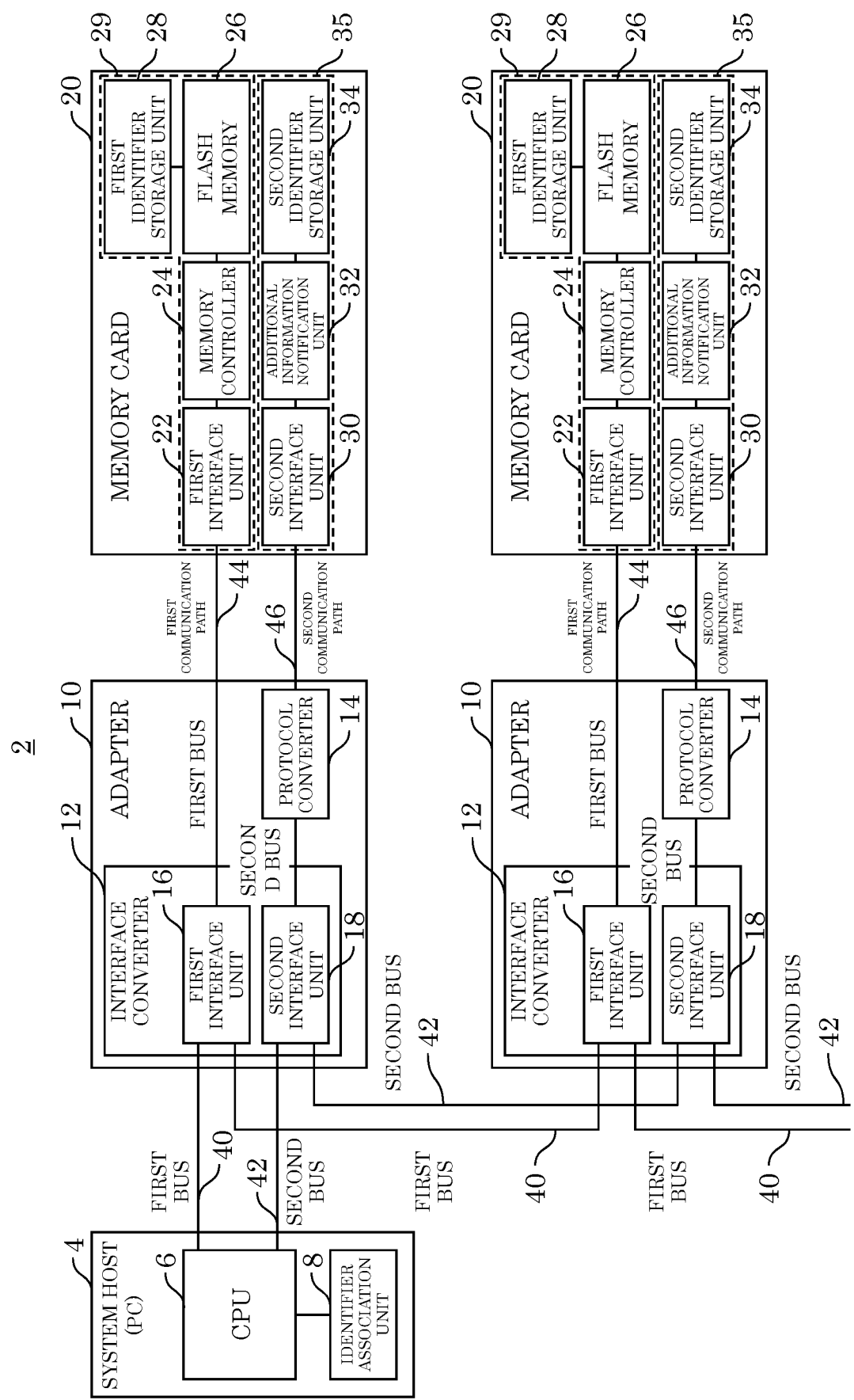
FIG. 1 is a schematic block diagram of a data transfer system according to a first exemplary embodiment.

FIG. 1 is a schematic block diagram of data transfer system 2 according to a first exemplary embodiment. A configuration will be described focusing on a difference from data transfer system 502 illustrated in FIG. 10.

Data transfer system 2 illustrated in FIG. 1 performs high-speed data communication between system host 4 and hot swap memory card 20 via adapter 10 that does not include integration unit 113. Integration unit 113 is removed for the purpose of minimizing a decrease in speed and achieving a cost reduction.

System host 4 has two external interfaces, that is, a first interface and a second interface. Local buses (first bus 40, second bus 42) are provided on a side of system host 4, and the local buses are equivalently connected to communication paths (first communication path 44, second communication path 46) in memory card 20, respectively. Interface converter 12 of adapter 10 includes first interface unit 16 for first bus 40 and second interface unit 18 for second bus 42. In addition, adapter 10 includes protocol converter 14 for protocol conversion between second bus 42 and second communication path 46. Protocol converter 14 performs conversion into a data signal for second interface unit 30 of memory card 20 in second interface unit 18 and transmits the data signal to second interface unit 30 of memory card 20. Note that, USB3.1/Thunderbolt or the like that performs high-speed data communication is assumed as first bus 40, and USB2 or the like that performs standard data communication, which is communication with a lower communication speed than that of high-speed data communication, is assumed as second bus 42. However, first bus 40 may be SATA Express (SerialATA Express) or OCuLink (Optical copper Link), and second bus 42 may be RS-232C, RS-442, I2C, or the like. That is, it is only required that two different buses are used.

In interface converter 12 of adapter 10, first interface unit 16 supports a plurality of types of communication protocols, and performs communication using one selected communication protocol, and the one communication protocol can control an external device using an interface of a physical signal common to a local bus of system host 4. Furthermore, second interface unit 18 is an interface that can specify the type of the communication protocol in first interface unit 16 immediately after connection, make first interface unit 16 communicable with the communication protocol, and after making first interface unit 16 communicable, perform communication using a communication protocol different from that in first interface unit 16.

Further, first identifier storage unit 28 and second identifier storage unit 34 are added as blocks to memory card 20. First identifier storage unit 28 is an identifier storage unit that stores an identifier to be notified to system host 4 through first communication path 44, whereas second identifier storage unit 34 is an identifier storage unit that stores an identifier to be notified through second communication path 46. First interface unit 22 of memory card 20 controls an external device using an interface of a physical signal common to a local bus of a system host, and second interface unit 30 of memory card 20 may be an interface different from the local bus.

First interface unit 22, memory controller 24, flash memory 26, and first identifier storage unit 28 in memory card 20 as illustrated in FIG. 1 constitute memory unit 29. Second interface unit 30, additional information notification unit 32, and second identifier storage unit 34 in memory card 20 constitute additional information registration unit 35. The additional information is, for example, information indicating restriction of access of user data to memory card 20 or the like.

Memory card 20 and adapter 10 can achieve a configuration in which a plurality of blocks are connected by a daisy chain. In data transfer system 2 illustrated in FIG. 1, a configuration example is achieved in which (upper) adapter 10 is connected to (lower) adapter 10 with the same function, and (lower) adapter 10 is connected to (lower) memory card 20 with the same function as (upper) memory card 20.

System host 4 includes identifier association unit 8 that determines an identifier in memory card 20.

Figure 2A:
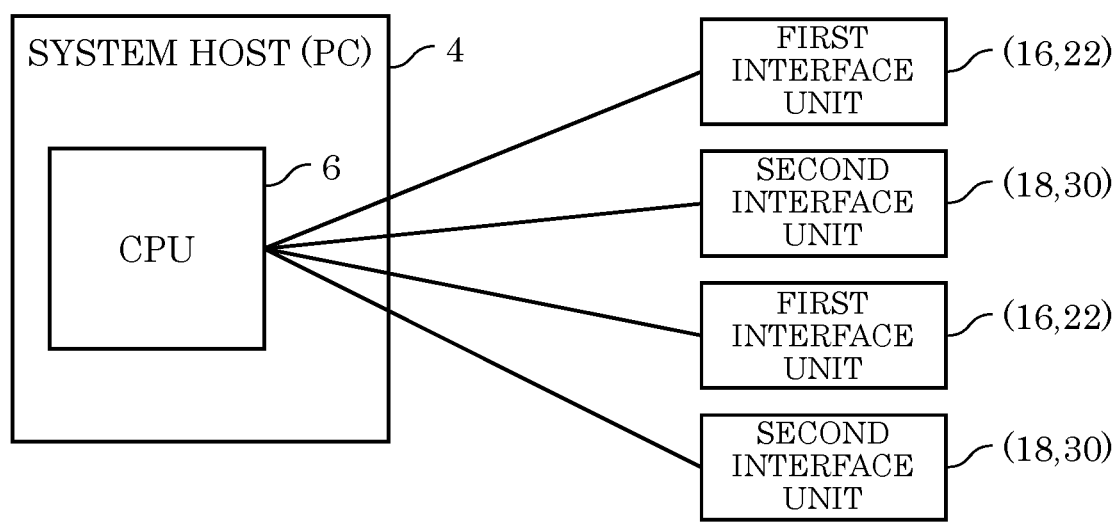
FIG. 2A is a diagram illustrating a state where a system host recognizes that a first interface unit and a second interface unit are only logically present in plural.

Meanwhile, the following disadvantage occurs only with the configuration of data transfer system 2 illustrated in FIG. 1. That is, as illustrated in FIG. 2A, system host 4 recognizes that first interface units 16, 22 and second interface units 18, 30 are only logically present in plural. That is to say, system host 4 cannot grasp which first interface unit 16, 22 is associated with which second interface unit 18, 30.

Figure 2B:
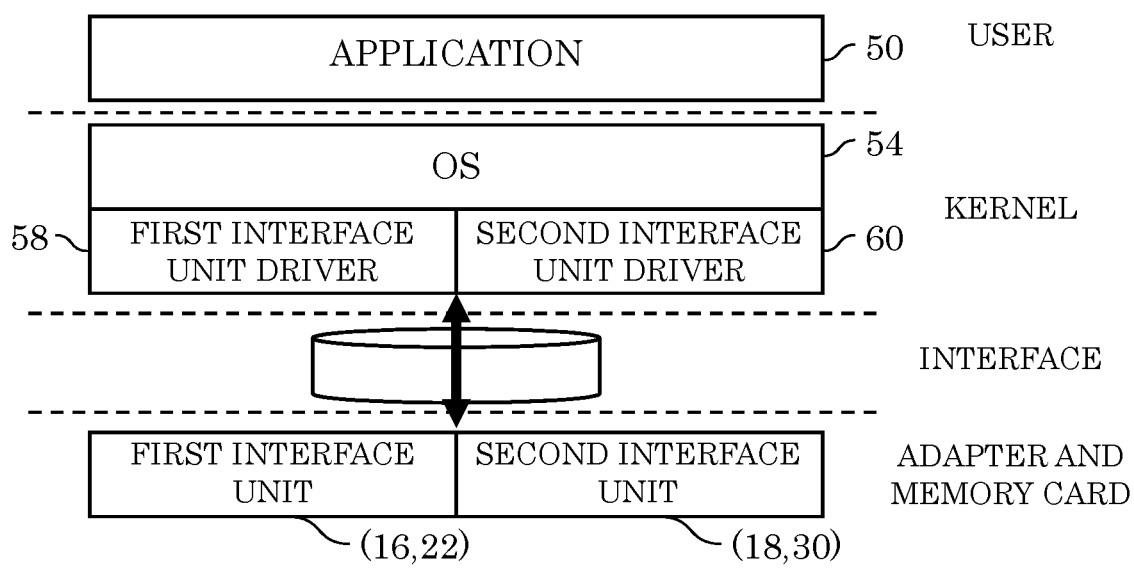
FIG. 2B is a diagram of a device driver stack in the system host, and illustrates a software configuration by taking a personal computer (PC) equipped with, as the system host, Windows (registered trademark), which is an operation system of Microsoft (registered trademark), as an example.

The above disadvantage will be described with reference to a device driver stack of system host 4 illustrated in FIG. 2B. Similarly to FIG. 3 to be described later, FIG. 2B illustrates a software configuration by taking a personal computer (PC) equipped with, as a system host, Windows (registered trademark), which is an operation system of Microsoft (registered trademark), as an example. Application 50 is software that is operable by a user. Operation system (OS) 54 included in a kernel space provides basic functions to application 50. The kernel space further includes first interface unit driver 58 and second interface unit driver 60, which are software groups for controlling hardware. First interface unit driver 58 is a device driver that controls first interface unit 16 of adapter 10, whereas second interface unit driver 60 is a device driver that controls second interface unit 18 of adapter 10.

The plurality of first interface units 16, 22 and first communication path 44, and the plurality of second interface units 18, 30 and second communication path 46 are present in adapter 10 and memory card 20 that are connected to system host 4 by the interface cable and the daisy chain, but the association between memory controller 24 attached to first interface unit 22 and additional information notification unit 32 attached to second interface unit 30 is unknown for system host 4, first interface unit driver 58, and second interface unit driver 60. Consequently, there is a disadvantage that system host 4 cannot appropriately use the additional information of each memory card.

Figure 3:
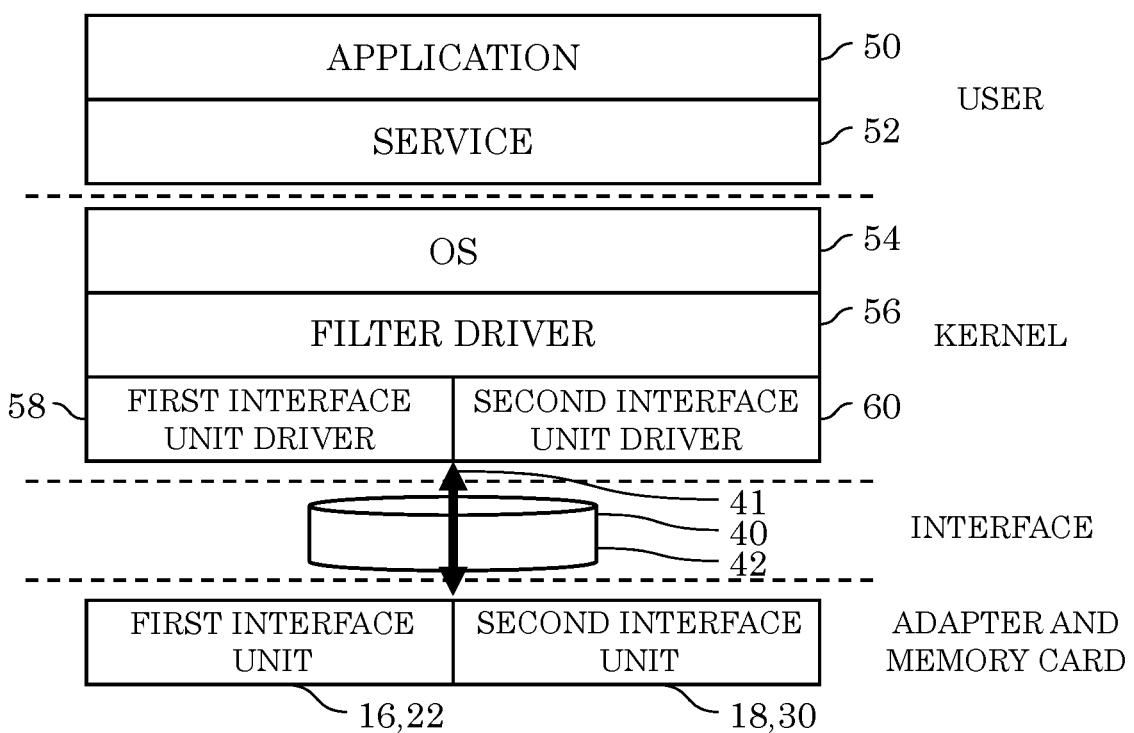
FIG. 3 is a diagram of a device driver stack in the system host of the data transfer system according to the first exemplary embodiment, and illustrates a software configuration in a personal computer (PC) equipped with, as the system host, Windows (registered trademark), which is an operation system of Microsoft (registered trademark).

In order to solve the above disadvantage, data transfer system 2 according to the first exemplary embodiment adopts the following configuration. FIG. 3 is a diagram of a device driver stack of system host 4 in data transfer system 2 according to the first exemplary embodiment. FIG. 3 illustrates a software configuration in a personal computer (PC) equipped with, as a system host, Windows (registered trademark), which is an operation system of Microsoft (registered trademark). Application 50 is software that includes a user interface and can be operated by a user, and corresponds to, for example, an explorer for file operation, an editing application for editing a video, or the like. Service 52 is software that operates between application 50 and a software group that operates in a kernel space with a high processing priority. In addition, service 52 performs intermediate processing on the access from application 50 as necessary, thereby providing a function of passing processing to the software in the kernel space and a function that is common to a plurality of applications. As will be described later, service 52 provides a function of bundling (associating) identifiers (an identifier in first identifier storage unit 28 and an identifier in second identifier storage unit 34) in same memory card 20. Application 50 and service 52 generally operate in a mode in a user space, and the processing priority is set to be lower than that in the kernel space.

Operation system (OS) 54 included in the kernel space provides basic functions to application 50. Filter driver 56 is located between operation system (OS) 54 and a software group closer to hardware, performs partial processing on processing from the user space, and then passes the processing to a lower software group. As will be described later, filter driver 56 has a function of holding additional information corresponding to flash memory 26 based on association information of identifiers (a first identifier and a second identifier) in same memory card 20 from service 52. The kernel space further includes first interface unit driver 58 and second interface unit driver 60, which are software groups for controlling hardware. First interface unit driver 58 is a device driver that controls first interface unit 16 of adapter 10, whereas second interface unit driver 60 is a device driver that controls second interface unit 18 of adapter 10. These drivers (58, 60) increase in substance as the number of adapters 10 connected increases. For example, in a case where two adapters 10 are connected, two first interface unit drivers 58 and two second interface unit drivers 60 are present.

Interface cable 41 physically connects system host 4 and adapter 10. For example, in a case where adapter 10 is a Thunderbolt (registered trademark) device, connection is made by a USB-C cable compatible with Thunderbolt. The configuration in which the cable connects system host 4 and adapter 10 is not illustrated in detail in FIG. 3, but since the diagram of the stack in FIG. 3 is for the purpose of describing the configuration of the software module, interface cable 41 is simply represented by one block.

First interface unit 16 and second interface unit 18 of the adapter 10 are connected via interface cable 41. Furthermore, first interface unit 16 of adapter 10 and first interface unit 22 of memory card 20 are logically equivalent from the viewpoint of system host 4, and thus system host 4 can appropriately control memory card 20. The same holds for the relationship between second interface unit 18 of adapter 10 and second interface unit 30 of memory card 20. Note that first interface unit 22 desirably performs high-speed data communication, and second interface unit 30 performs standard data communication.

2.2. Operation of Data Transfer System

Figure 4:
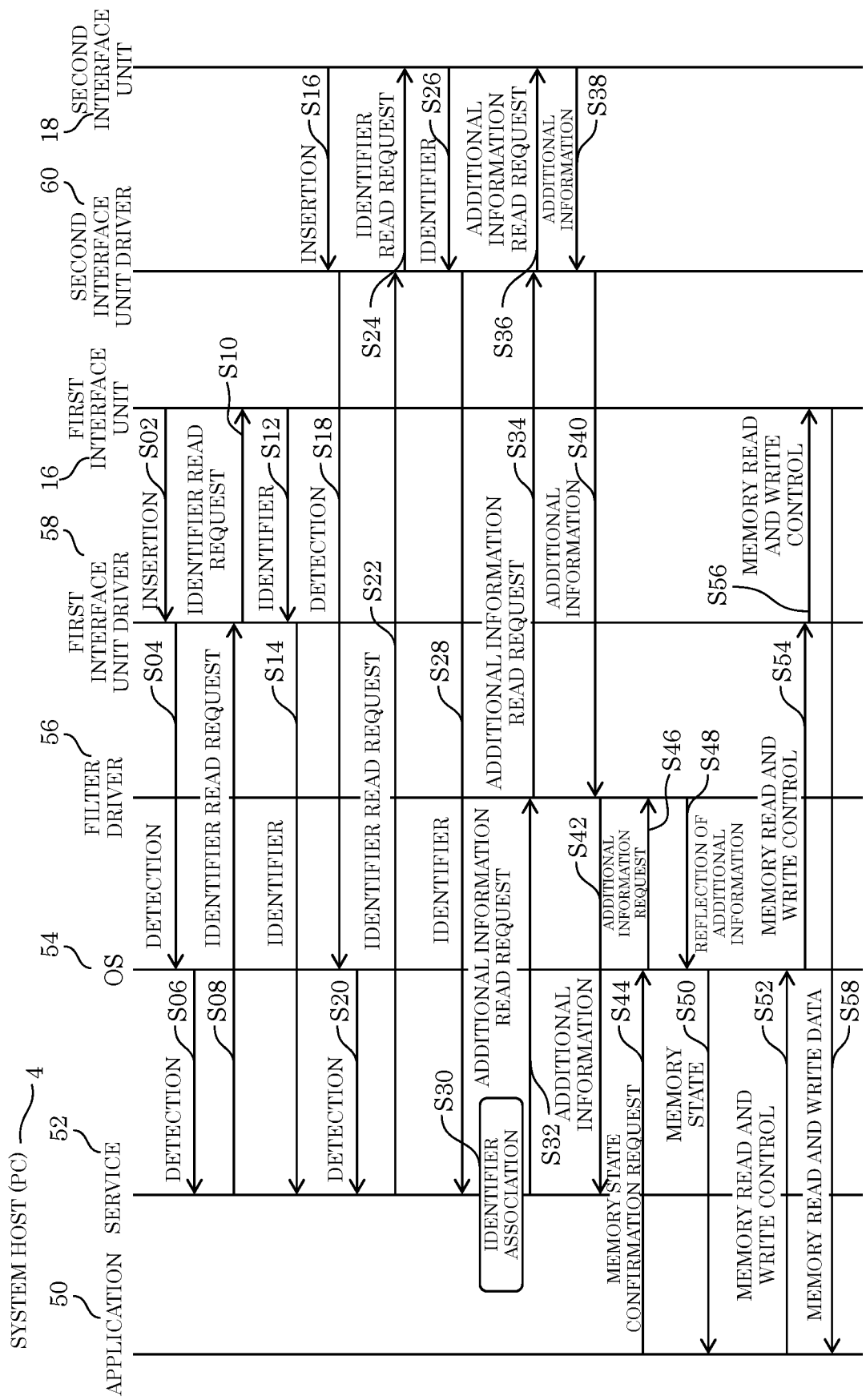
FIG. 4 is a sequence diagram for explaining an operation of each block in the data transfer system according to the first exemplary embodiment.

FIG. 4 is a sequence diagram for explaining an operation of each block of data transfer system 2 according to the first exemplary embodiment. A flow of processing in data transfer system 2 will be described with reference to the sequence diagram illustrated in FIG. 4. Note that the module illustrated in FIG. 4 corresponds to the diagram of the device driver stack illustrated in FIG. 3.

When memory card 20 is inserted into adapter 10, power is first applied from first interface unit 16 of adapter 10 to memory card 20, and first interface unit 16 notifies first interface unit driver 58 that memory card 20 has been inserted (S02). First interface unit driver 58 initializes a device via first interface unit 22 of memory card 20, and notifies OS 54 that memory card 20 has been inserted (S04). OS 54 notifies service 52 that the insertion of memory card 20 has been detected as an event (S06).

Although FIG. 4 illustrates the notification to service 52 as an event as an example, service 52 may detect that memory card 20 has been inserted by independently making an inquiry to memory card 20 via first interface unit driver 58 at regular time intervals (polling).

Service 52 having received the notification about the detection of the insertion of memory card 20 from first interface unit 16 of adapter 10 transmits an identifier read request to first interface unit driver 58 (S08), and first interface unit driver 58 having received the request transmits the identifier read request to first interface unit 16 of adapter 10 (S10). First interface unit 16 of adapter 10 transmits an identifier in first identifier storage unit 28 obtained through first communication path 44, and first interface unit 22 of memory card 20 to first interface unit driver 58 (S12), and first interface unit driver 58 transmits the identifier to service 52 (S14).

Similarly to the above, when the insertion of memory card 20 is notified from second interface unit 18 of adapter 10 to second interface unit driver 60 (S16), the detection of insertion is notified from second interface unit driver 60 to OS 54 and then from OS 54 to service 52 (S18, S20). Service 52 having received the notification about the detection of the insertion of memory card 20 transmits an identifier read request to second interface unit driver 60 (S22), and second interface unit driver 60 having received the request transmits the identifier read request to second interface unit 18 of adapter 10 (S24). Second interface unit 18 of adapter 10 transmits an identifier in second identifier storage unit 34 obtained through second communication path 46 and second interface unit 30 of memory card 20 to second interface unit driver 60 (S26), and second interface unit driver 60 transmits the identifier to service 52 (S28).

In service 52, identifier association unit 8 attached to CPU 6, which is the central processing unit of system host 4, associates the identifier in first identifier storage unit 28 obtained by first interface unit 16 of adapter 10 with the identifier in second identifier storage unit 34 obtained by second interface unit 18 of adapter 10 (S30). That is, in service 52, identifier association unit 8 determines whether both identifiers are acquired from the same memory card 20 and associates the identifiers.

Based on the associated identifier, service 52 transmits, to filter driver 56, an additional information read request for reading the additional information stored in additional information notification unit 32 attached to second interface unit 30 of memory card 20 (S32). The additional information read request transmitted to filter driver 56 is transmitted via second interface unit driver 60 (S34) to second interface unit 18 of adapter 10 (S36). Second interface unit 18 of adapter 10 transmits additional information in additional information notification unit 32 obtained through second communication path 46, and second interface unit 30 of memory card 20 to second interface unit driver 60 (S38), and second interface unit driver 60 transmits the additional information to filter driver 56 (S40). The additional information is held by filter driver 56 and then transmitted to service 52 (S42).

In a case where application 50 accesses flash memory 26, application 50 first issues a memory state confirmation request to OS 54 (S44). At this time, since filter driver 56 holds memory state information as the additional information of flash memory 26, OS 54 issues an additional information request to filter driver 56 (546). OS 54 acquires the additional information of flash memory 26 (S48) and returns the memory state information to application 50 (S50). Based on the memory state information returned, memory read and write control is transmitted from application 50 to OS 54 (S52), first interface unit driver 58 (S54), and first interface unit 16 of adapter 10 (S56), and data is read and written from and to flash memory 26. The result of the data read and write is returned to application 50 via first interface unit 16 of adapter 10 (S58).

2.3. Effects and Others

As described above, in the present exemplary embodiment, memory card 20 includes two external interfaces, that is, first interface unit 22 and second interface unit 30 that are connected to system host 4, and is composed of memory unit 29 and additional information registration unit 35. First interface unit 22 controls an external device using an interface of a physical signal common to a local bus of system host 4, and second interface unit 30 is an interface different from the local bus. Memory unit 29 includes first identifier storage unit 28 that stores an identifier of memory unit 29, flash memory 26 that stores user data, and memory controller 24 that controls first identifier storage unit 28 and flash memory 26 via first interface unit 22. Additional information registration unit 35 includes second identifier storage unit 34 that stores the same identifier as memory unit 29 and additional information notification unit 32 that stores additional information and notifies system host 4 of an identifier in second identifier storage unit 34 and the additional information via second interface unit 30. When memory card 20 is inserted, system host 4 associates memory unit 29 with additional information registration unit 35 by the identifiers stored in first identifier storage unit 28 and second identifier storage unit 34. Adapter 10 is connected to system host 4 by interface cable 41 that communicates a first data signal for high-speed data communication and a second data signal for standard data communication, and has interface converter 12 including first interface unit 16 that communicates the first data signal of system host 4 to the memory card and second interface unit 18 that communicates the second data signal of system host 4 to memory card 20. In interface converter 12 of adapter 10, first interface unit 16 supports a plurality of types of communication protocols, and performs communication using one selected communication protocol, and the one communication protocol controls an external device using an interface of a physical signal common to a local bus of system host 4. Second interface unit 18 is an interface that can specify the type of the communication protocol in first interface unit 16 immediately after connection, make first interface unit 16 communicable with the communication protocol, and after making first interface unit 16 communicable, performs communication using a communication protocol different from that in first interface unit 16.

As a result, the data transfer system connects a memory card equivalently to a local bus on a system host side, thereby reducing the number of control components, minimizing a decrease in speed, and achieving a cost reduction.

3. Second Exemplary Embodiment

A second exemplary embodiment will be described below with reference to FIG. 5.

3.1. Configuration of Data Transfer System

Figure 5:
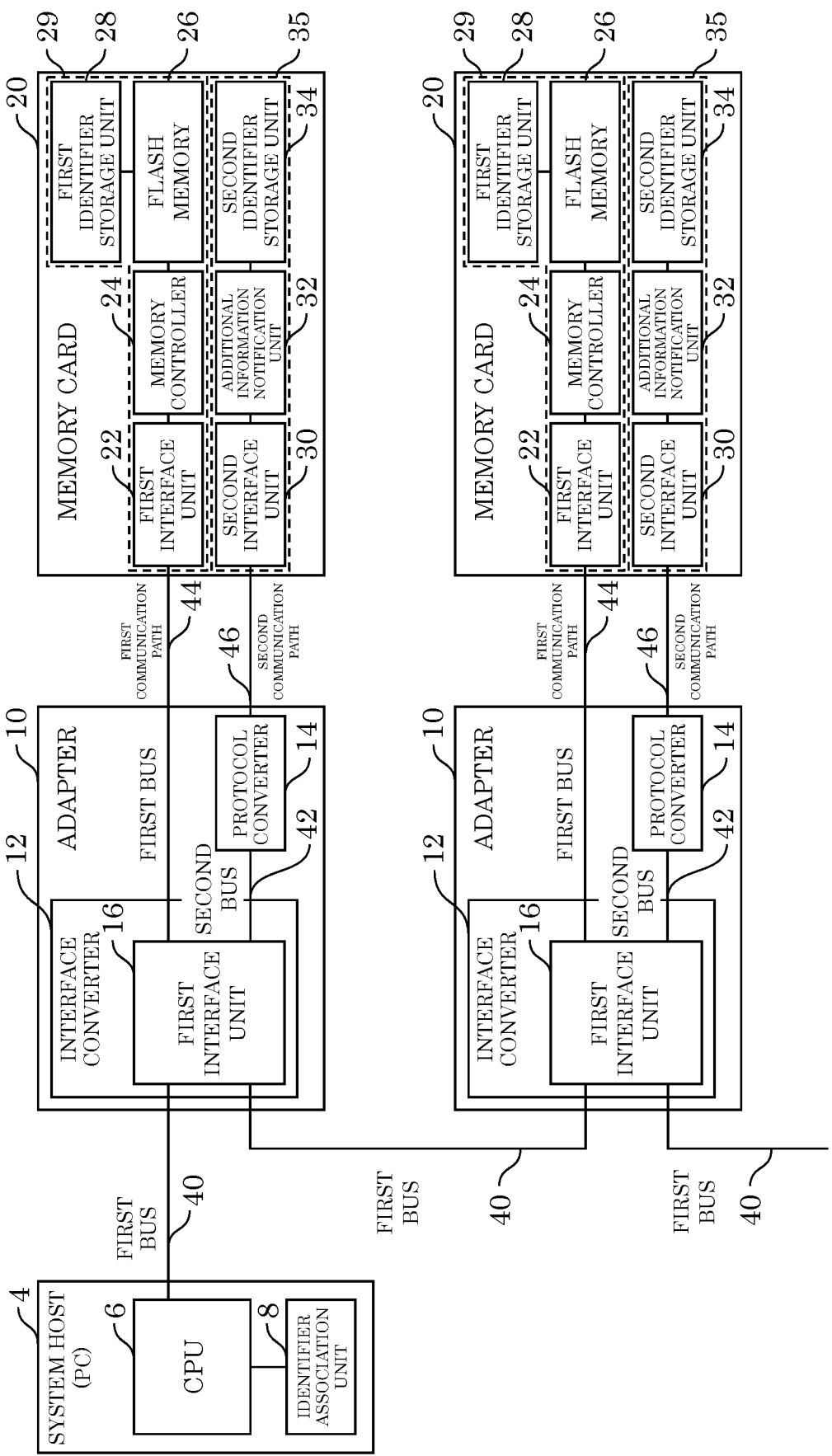
FIG. 5 is a schematic block diagram of a data transfer system according to a second exemplary embodiment.

FIG. 5 is a schematic block diagram of data transfer system 102 according to a second exemplary embodiment. Data transfer system 102 according to the second exemplary embodiment illustrated in FIG. 5 has a substantially similar configuration to data transfer system 2 according to the first exemplary embodiment illustrated in FIG. 1. Adapter 10A of data transfer system 102 is different in configuration from adapter 10 of data transfer system 2.

In data transfer system 102 according to the second exemplary embodiment illustrated in FIG. 5, system host 4 and adapter 10A, and adapter 10A and adapter 10A connected by a daisy chain are connected only by first bus 40. That is, one local bus (first bus 40) is provided on a side of system host 4, but the local bus logically includes two communication paths (first communication path 44, second communication path 46) in memory card 20. As a result, adapter 10A includes only first interface unit 16 corresponding to first bus 40.

Data transfer system 102 according to the second exemplary embodiment also connects a memory card equivalently to a local bus on a system host side, thereby reducing the number of control components, minimizing a decrease in speed, and achieving a cost reduction.

4. Third Exemplary Embodiment

Next, a third exemplary embodiment will be described below with reference to FIG. 6.

4.1. Configuration of Data Transfer System

Figure 6:
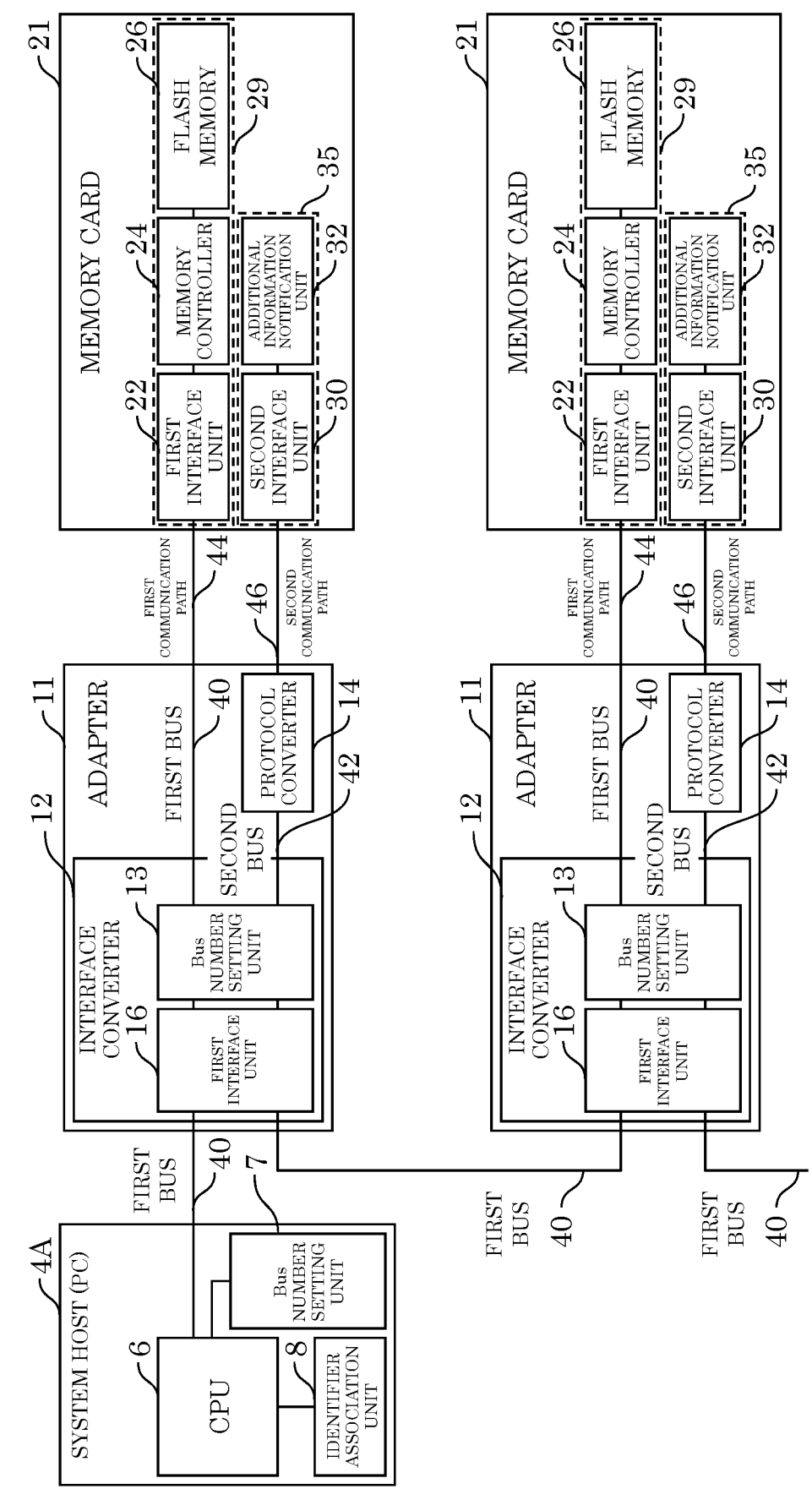
FIG. 6 is a schematic block diagram of a data transfer system according to a third exemplary embodiment.

FIG. 6 is a schematic block diagram of data transfer system 202 according to a third exemplary embodiment. Data transfer system 202 according to the third exemplary embodiment illustrated in FIG. 6 is also different from data transfer system 102 according to the second exemplary embodiment illustrated in FIG. 5 in the configurations of system host 4A, adapter 11, and memory card 21.

In data transfer system 202 according to the third exemplary embodiment illustrated in FIG. 6, system host 4A and interface converter 12 of adapter 11 include Bus number setting units 7 and 13, respectively. Bus number setting units 7, 13 assign a unique bus number to each bus (and each communication path) according to a predetermined logic. Further, memory card 21 in data transfer system 202 according to the third exemplary embodiment does not include the first identifier storage unit and the second identifier storage unit.

System host 4A of data transfer system 202 according to the third exemplary embodiment illustrated in FIG. 6 associates flash memory 26 in the same memory card 21 with the corresponding additional information (in additional information notification unit 32) according to the logic of assigning a bus number to each bus in Bus number setting units 7, 13.

Data transfer system 202 according to the third exemplary embodiment also connects a memory card equivalently to a local bus on a system host side, thereby reducing the number of control components, minimizing a decrease in speed, and achieving a cost reduction.

5. Fourth Exemplary Embodiment

Next, a fourth exemplary embodiment will be described below with reference to FIG. 7.

5.1. Configuration of Data Transfer System

Figure 7:
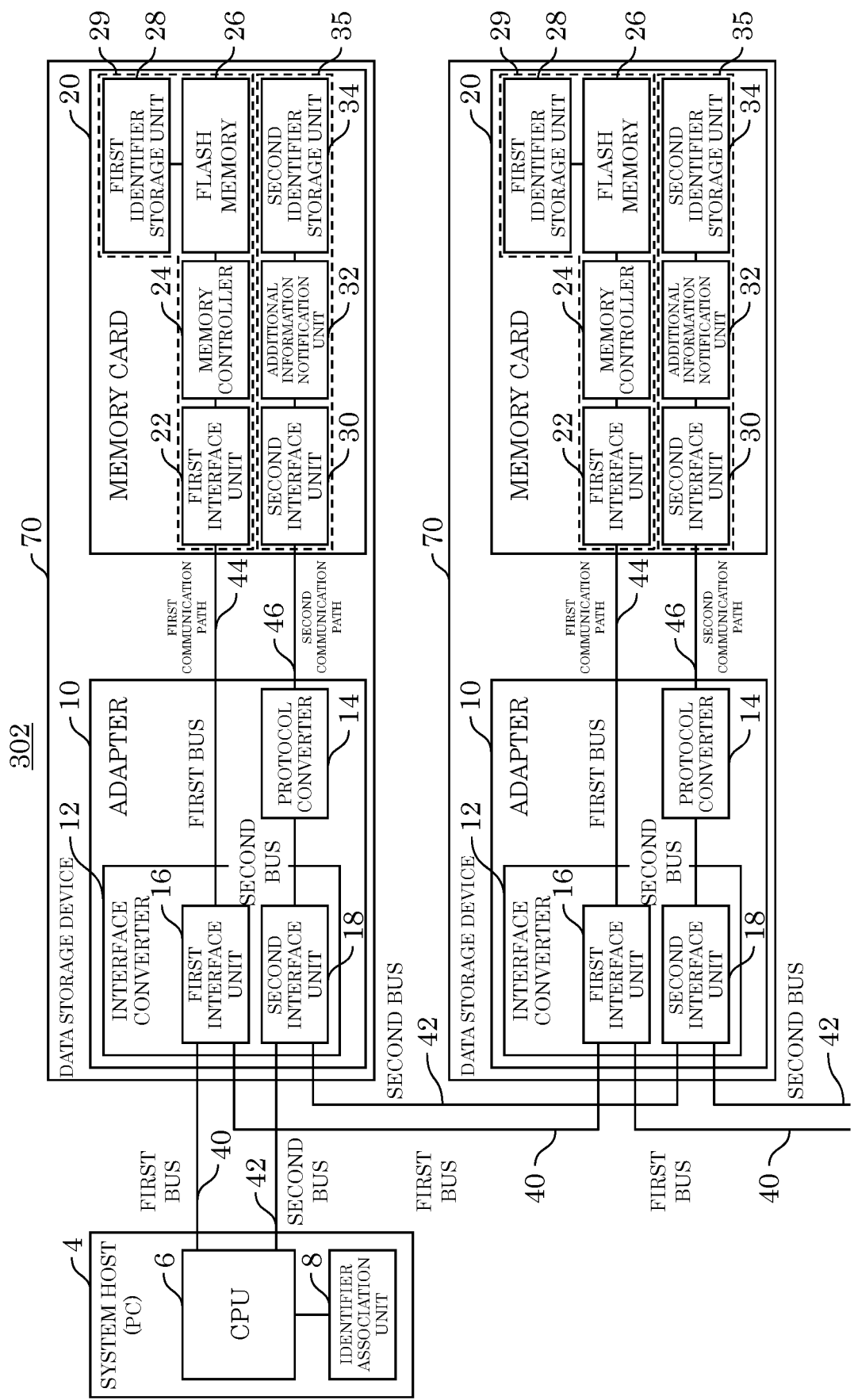
FIG. 7 is a schematic block diagram of a data transfer system according to a fourth exemplary embodiment.

FIG. 7 is a schematic block diagram of data transfer system 302 according to a fourth exemplary embodiment. Data transfer system 302 according to the fourth exemplary embodiment illustrated in FIG. 7 also has a substantially similar configuration to data transfer system 2 according to the first exemplary embodiment illustrated in FIG. 1.

In data transfer system 302 according to the fourth exemplary embodiment illustrated in FIG. 7, adapter 10 and memory card 20 in data transfer system 2 according to the first exemplary embodiment illustrated in FIG. 1 constitute data storage device 70 as one case.

Data transfer system 302 according to the fourth exemplary embodiment, which includes data storage device 70, also connects a memory card equivalently to a local bus on a system host side, thereby reducing the number of control components, minimizing a decrease in speed, and achieving a cost reduction.

6. Other Exemplary Embodiments

The first to fourth exemplary embodiments have been described above as examples of the technique disclosed in the present application. However, the technique of the present disclosure is not limited to the exemplary embodiments, and also applicable to other exemplary embodiments that undergo some modifications, replacements, additions, and omissions, for example, as appropriate. In addition, new exemplary embodiments can be made by combining constituent elements described in the first to fourth exemplary embodiments.

Note that the exemplary embodiments described above are provided to exemplify the technique in the present disclosure. Therefore, it is possible to make various modifications, replacements, additions, omissions, and the like within the scope of the claims and equivalents thereof.

The present disclosure can be used in a PCIe compatible information processing device.

What is claimed is:

1. A memory card comprising:
   two external interfaces including a first interface unit and a second interface unit that are connected to a system host;
   a memory unit; and
   an additional information registration unit,
   wherein the first interface unit controls an external device using an interface of a physical signal common to a local bus of the system host,
   the second interface unit is an interface different from the local bus,
   the memory unit includes
   a first identifier storage unit that stores an identifier of the memory unit,
   a flash memory that stores user data, and
   a memory controller that controls the first identifier storage unit and the flash memory via the first interface unit,
   the additional information registration unit includes a second identifier storage unit that stores an identifier same as the identifier of the memory unit, and an additional information notification unit that stores additional information and notifies the system host of the identifier in the second identifier storage unit and the additional information via the second interface unit, and when the memory card is connected to the system host, the memory unit and the additional information registration unit are associated with each other by the identifier stored in the first identifier storage unit and the identifier stored in the second identifier storage unit.

2. The memory card according to claim 1, wherein the additional information notification unit holds information indicating restriction of access of the user data to the memory card.

3. The memory card according to claim 1, wherein the first interface unit converts a signal from the local bus of the system host into a different physical signal to obtain a signal logically equivalent to the local bus.

4. The memory card according to claim 1, wherein
the first interface unit performs high-speed data communication, and
the second interface unit performs standard data communication with a lower communication speed than a communication speed of the high-speed data communication.

5. A data storage device that is connected to a system host by a cable that communicates a first data signal for high-speed data communication and a second data signal for standard data communication with a lower communication speed than a communication speed of the high-speed data communication, the data storage device comprising:

an adapter that includes an interface converter having a first adapter interface unit that communicates the first data signal of the system host to a memory card and a second adapter interface unit that communicates the second data signal of the system host to the memory card; and the memory card that communicates the first data signal and the second data signal of the adapter and includes a memory unit and an additional information registration unit, wherein the first adapter interface unit supports a plurality of types of communication protocols and performs communication using one communication protocol selected from the plurality of types of communication protocols, the one communication protocol controls an external device using an interface of a physical signal common to a local bus of the system host, the second adapter interface unit specifies a type of the one communication protocol in the first adapter interface unit immediately after connection to make the first adapter interface unit communicable with the one communication protocol, and after making the first adapter interface unit communicable, performs communication using a communication protocol different from the one communication protocol in the first adapter interface unit, the memory unit includes
a first identifier storage unit that stores an identifier of the memory unit,
a flash memory that stores user data, and
a memory controller that controls the first identifier storage unit and the flash memory via a first memory interface unit, the additional information registration unit includes
a second identifier storage unit that stores an identifier same as the identifier of the memory unit, and
an additional information notification unit that stores additional information and notifies the system host of the identifier in the second identifier storage unit and the additional information via a second memory interface unit, and when the memory card is connected to the system host, in the system host, the memory unit and the additional information registration unit are associated with each other by the identifier stored in the first identifier storage unit and the identifier stored in the second identifier storage unit.

6. The data storage device according to claim 5, wherein the second adapter interface unit is connected to a second memory interface unit of the memory card to perform communication.

7. The data storage device according to claim 5, wherein the additional information notification unit holds information indicating restriction of access of the user data to the memory card.

8. The data storage device according to claim 5, wherein the first memory interface unit converts a signal from the local bus of the system host into a different physical signal to obtain a signal logically equivalent to the local bus.

9. The data storage device according to claim 5, wherein
the first memory interface unit performs high-speed data communication, and
the second memory interface unit performs standard data communication with a lower communication speed than a communication speed of the high-speed data communication.

10. A system host comprising:
a first interface that is connected to a first interface unit of a memory card;
a second interface that is connected to a second interface unit of the memory card; and
an identifier association unit,
wherein the first interface is an interface for a physical signal common to a local bus, and acquires an identifier and reads and writes user data via the first interface unit of the memory card,
the second interface controls the memory card using an interface that is different from the interface for a physical signal common to the local bus, and acquires, via the second interface unit of the memory card, an identifier same as the identifier acquired via the first interface unit of the memory card, and
the identifier association unit associates the first interface unit of the memory card with the second interface unit of the memory card when the memory card is connected to the system host.

11. The system host according to claim 10, wherein the system host acquires information indicating restriction of access of the user data to the memory card via the second interface unit of the memory card.

12. The system host according to claim 10, wherein the first interface converts a signal from the local bus into a different physical signal to obtain a signal logically equivalent to the local bus.

13. The system host according to claim 10, wherein
the first interface and the first interface unit of the memory card perform high-speed data communication, and
the second interface and the second interface unit of the memory card perform standard data communication with a lower communication speed than a communication speed of the high-speed data communication.

14. A system host comprising:
a first interface that is connected to a first interface unit of a memory card via a first interface unit of an adapter;
a second interface that is connected to a second interface unit of the memory card via a second interface unit of the adapter; and
an identifier association unit,
wherein the first interface is an interface for a physical signal common to a local bus, and acquires an identifier and reads and writes user data via the first interface unit of the memory card,
the second interface controls the memory card using an interface that is different from the interface for a physical signal common to the local bus, and acquires, via the second interface unit of the memory card, an identifier same as the identifier acquired via the first interface unit of the memory card, and
the identifier association unit associates the first interface unit of the memory card with the second interface unit of the memory card when the memory card is connected to the system host.

15. The system host according to claim 14, wherein the adapter performs conversion into a data signal for the second interface unit of the memory card in the second interface unit of the adapter and transmits the data signal to the second interface unit of the memory card.

16. The system host according to claim 14, wherein the system host acquires information indicating restriction of access of the user data to the memory card via the second interface unit of the memory card.

17. The system host according to claim 14, wherein the first interface converts a signal from the local bus into a different physical signal to obtain a signal logically equivalent to the local bus.

18. The system host according to claim 14, wherein
the first interface, the first interface unit of the adapter, and the first interface unit of the memory card perform high-speed data communication, and
the second interface, the second interface unit of the adapter, and the second interface unit of the memory card perform standard data communication with a lower communication speed than a communication speed of the high-speed data communication.

19. A memory card identification method comprising:
storing an identifier of a memory unit in the memory unit of a memory card;
storing an identifier of an additional information registration unit in the additional information registration unit of a memory card;
reading and acquiring the identifier of the memory unit;
reading and acquiring the identifier of the additional information registration unit; and
comparing the identifier of the memory unit acquired with the identifier of the additional information registration unit acquired, and determining whether the memory unit and the additional information registration unit are in a same memory card.

* * * * *